(12) United States Patent
Handa et al.

(10) Patent No.: US 6,402,865 B1
(45) Date of Patent: Jun. 11, 2002

(54) MULTILAYERED POLYMERS AND FOAMS WITH VARIABLE SIZED INTERLAYER GAPS

(75) Inventors: Paul Handa, Orleans; Zhiyi Zhang, Ottawa, both of (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/351,000

(22) Filed: Jul. 12, 1999

(51) Int. Cl.$^7$ ................................................ B32B 31/14
(52) U.S. Cl. ........................ 156/77; 156/281; 264/45.1; 264/85
(58) Field of Search ................... 156/77, 281; 264/45.1, 264/85

(56) References Cited

U.S. PATENT DOCUMENTS 3,669,792 A * 6/1972 Mitsukawa et al. ............ 156/77
3,798,104 A * 3/1974 Mallonee et al. ............ 156/281

* cited by examiner

Primary Examiner—John J. Gallagher
(74) Attorney, Agent, or Firm—J. Wayne Anderson

(57) ABSTRACT

The invention disclosed provides integral multilayered polymers with variable interlayer gaps, and processes for their manufacture. The materials thus produced consist of many layers of a polymeric material, which may be a single polymer or a blend of compatible polymers, separated by discontinuous narrow gaps containing air and/or a blowing agent. The layer density can be controlled within a wide range, typically 10 to 2000 layers/mm, while the gap width between the layers can be controlled either to $\leq 100$ nanometers (called nanolayered polymers) or $\geq 1$ micrometer (called microlayered polymers), depending on the process. These layered materials are mechanically strong and have excellent thermal and electrical, and sound insulation properties. Two distinct mechanisms were developed for producing such materials. A first process produces nanolayered polymers and involves first introducing a low degree of entanglement among some of the polymer chains and then breaking apart these entanglements using a blowing agent. The microlayer process involves the use of stress-induced nucleation to uniformly grow cells in the polymer containing dissolved blowing agent and force the cells to grow in a preferential direction.

8 Claims, 21 Drawing Sheets

MULTILAYERED POLYMERS AND FOAMS WITH VARIABLE SIZED INTERLAYER GAPS

FIELD OF THE INVENTION

The present invention relates to the design and development of a new kind of polymeric material having a layered structure, a relatively high density, and good thermal and electrical insulation properties.

BACKGROUND OF THE INVENTION

Polymer foams are widely used for thermal and electrical insulation; construction insulation boards and coaxial communication cables are typical examples of such uses. The blowing agent (defined as a compressed gas or vapor or liquid), used for making foam, or gas trapped in the foam-cells has a much lower thermal conductivity and a lower dielectric constant than the polymer. As a result, the thermal conductivity and dielectric constant of foams are significantly smaller than those of the parent material, and the lower the foam density, the greater the reduction in the thermal conductivity and dielectric constant. See Rodriguez-Perez et al.[1] and Knott[2]. In addition to foam density, the cell geometry, including size and shape, and cell density, also affect the insulation properties. Thermal conductivity, for example, shows a significant dependence on cell geometry. See Harding.[3]

Recently, polymer foams with very small cells have been developed for use in advanced and complex electronic devices. Nanofoams, for example, are being developed to manufacture chips with very high on-chip device densities. The target for the nanofoams is to achieve a dielectric constant of 2.0 (see, for example, Hedrick et al.[4]). In order to produce nanofoams, selected thermally labile blocks are introduced into a high glass transition temperature $T_g$ polymer, such as polyimide. On heating, labile blocks undergo sharp and clean thermal decomposition at a temperature much below the $T_g$ of the parent polymer to give a nanometer-sized closed-cell structure with about 20% void space.

Although foaming is the most popular way to use polymers for insulation purposes, the efficiency in achieving the desired insulation using a cellular morphology is, in fact, quite low. The reason is that the cell walls in polymer foams will always act as paths for energy transfer no matter how low the foam density. Furthermore, any improved performance in insulation comes at the expense of making cell walls thinner, resulting in low-density foams. However, low-density foams are mechanically and electrically weak, and dimensionally unstable.

SUMMARY OF THE INVENTION

It is an object of the present invention to develop polymeric materials that have high density and good thermal, electrical and sound insulation properties.

The present invention deals with such a new class of polymeric materials. These materials have a layered structure with an adjustable layer density, typically around 10 to 2000 layers/mm. The layers are from 0.05 to 100 μm in thickness. The polymer layers are separated by discontinuous narrow gas-containing gaps. The size of the gaps can be controlled either to a few nanometers (to give nanolayered polymers) or to a few micrometers (to give microlayered polymers), depending on the process selected. Gap density, i.e. number of gaps per unit thickness, can be also used to describe the layered materials. Its value is almost the same as the layer density i.e. 10 to 2000 gaps/mm, and the gap width can be either ≦100 nm (for nanolayered polymers) or ≧1 μm (for microlayered polymers).

Another interesting property of the nanolayered polymers is that they lose the layered morphology and change back to regular structure at a certain temperature above the polymer's $T_g$. For example, nanolayered PS has silvery appearance but if kept at 120° C. for half an hour it becomes transparent, and the layer structure and interlayer gap in the material disappear. Accordingly, such materials could also be used as a temperature-sensitive smart-fuse or sensor. When the working temperature surpasses a certain preset security value, the materials lose their insulation properties.

The multilayered polymers according to the invention can be produced using two distinct process mechanisms, one for nanolayered polymers and another one for microlayered polymers. The nanolayer process involves a new concept of using a blowing agent to slice the polymer into layers. In this two-step process, the polymer is first built up from polymer pieces with a low degree of interfacial entanglement, that is, with a low degree of entanglements between polymer chains in adjacent pieces. This is followed by dissolving a selected blowing agent in the polymer matrix, and then subjecting the polymer-blowing agent solution to ambient pressure and a certain temperature which depends upon the polymer/blowing agent combination. The escaping blowing agent breaks apart the interfacial entanglements, resulting in a layered morphology. The properties and/or characteristics of the layered structure, including the layer thickness, the interconnections between the layers, and the interlayer gap, can be controlled in the process.

Two ways of introducing such inhomogeneous chain interfacial entanglements in polymers are: compression molding of stacked polymer films and compression molding of stacked polymer particles. It will be appreciated that other means could be employed for this purpose, such as ultrasonic welding, coextrusion, or other hot compression means.

Chain entanglements within a polymer film or polymer particles produced from the melt or solution state are usually high, homogeneous, and are not affected by the compression molding process. However, the polymer chain entanglement in the interfacial regions between the films or particles obtained by compression molding are not homogeneous and are significantly lower. The degree of polymer chain entanglement in the interfacial region depends on the interchain diffusion which, in turn, depends on the temperature, processing time, and pressure conditions used in the molding process. Thus, by appropriate control of these parameters, the molding process can produce materials with interfacial regions having a degree of polymer chain entanglement lower than that in the parent polymer material. The polymer with the low degree of interfacial polymer chain entanglement thus obtained is then exposed to a selected blowing agent to dissolve a certain amount of it. The selection of blowing agent depends upon the polymer, with various specific polymer/blowing agent combinations being preferred. When removed from the blowing agent and transferred into an ambient-pressure environment at a desired temperature, nanolayered morphology starts to develop in the material. It is important that the processing temperature at ambient pressure be below the $T_g$ of the polymer-blowing agent system. Otherwise, microcellular foam structure will form in the whole material because the highly entangled parts also deform at a temperature above the $T_g$, allowing cells to nucleate and grow.

Microlayered polymers are produced in a different way. The process involves the use of stress-induced nucleation mechanism, which is the subject of our co-pending U.S. application Ser. No. 09/161,448, filed Sep. 28, 1998, to uniformly nucleate cells in the polymers containing dissolved blowing agent, and force the cells to grow in a certain direction. Briefly, a polymer can be exposed to a blowing agent until saturation, followed by depressurization and compression stressing at a temperature above the $T_g$ of the polymer-blowing agent system. Cell nucleation starts instantly, followed by cell growth. When the applied stress is sufficiently high, cells tend to grow in a direction normal to the stress direction and some cells tend to be interconnected, resulting in a layered morphology with micrometer sized discontinuous gaps between the layers. In the extreme case when the applied stress is very high, the interlayer gaps become continuous and the material splits into several, completely separated thin layers.

According to one aspect of the invention an integral multi-layered polymer material is provided, comprising multiple layers of a polymeric material, and discontinuous gas-containing gaps between adjacent layers.

As will be appreciated hereinafter, the polymer material may be either a single polymer or a blend of compatible polymers.

According to another aspect of the invention, a process is provided for producing an integral multi-layered polymer, comprising (a) welding together a plurality of pieces of a polymeric material at a selected pressure and temperature, for a time sufficient to introduce interfacial entanglements between polymer chains in adjacent pieces, such that the degree of interfacial chain entanglement is lower than that within the parent polymer, (b) exposing the polymer material thus processed to a blowing agent to achieve a certain level of solubility of the blowing agent in the polymer, and (c) removing the polymer from the blowing agent to an environment at a pressure of 0 to 2 atm and processing the polymer at a selected temperature below the $T_g$ of the polymer/blowing agent combination, for a time sufficient to produce a multi-layered polymer of nanolayered morphology.

According to yet another aspect of the invention, a process is provided for producing an integral multi-layered polymer, comprising (a) selecting a suitable polymer and blowing agent combination, wherein the polymer is in a solid or melt state, and the blowing agent is in the form of a gas or a volatile liquid, (b) exposing the polymer to the blowing agent at a conditioning temperature, pressure and exposure time selected according to the thermodynamic properties of the polymer/blowing agent combination to form a polymer/blowing agent solution having a desired solubility up to the maximum saturation solubility of the blowing agent in the polymer, (c) slowly depressurizing to ambient pressure to prevent cell nucleation, (d) applying an external stress to the polymer/blowing agent solution at a temperature higher than the $T_g$ of the polymer/blowing agent system, wherein the amount of stress applied is selected to give a multi-layered polymer material of microlayered morphology with or without closed or open cells in the polymer layers, and (e) quenching the resulting polymer material by rapid cooling to a lower temperature.

DESCRIPTION OF THE PREFERRED EMBODIMENTS

Figure 1:
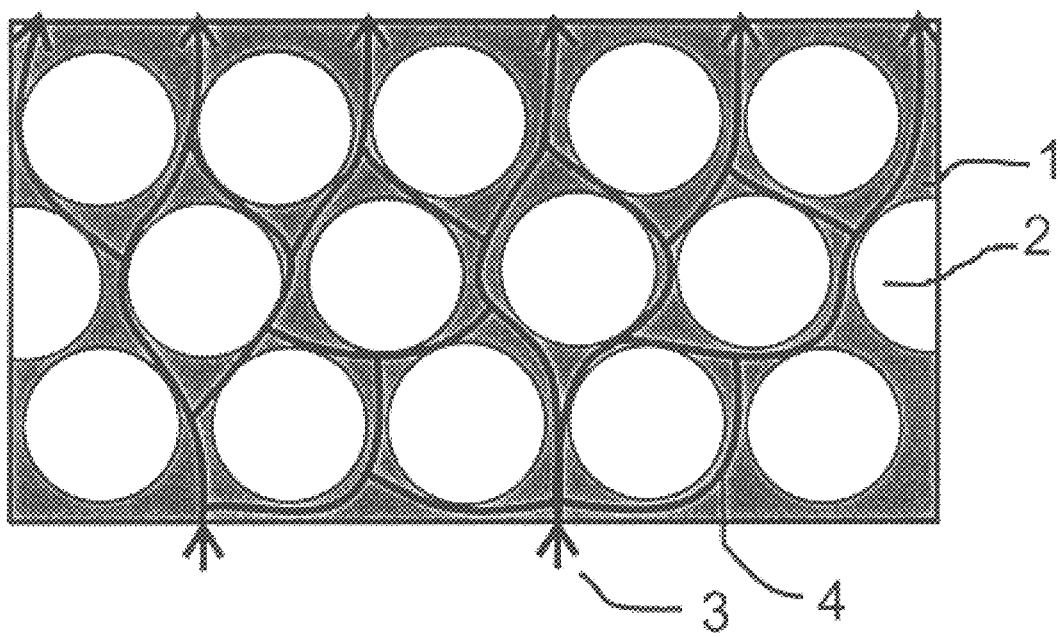
FIG. 1 is a model illustrating energy transfer in polymer foams.

The design of multilayered polymers is based on the analysis of polymer foams that are widely used for thermal and electrical insulation purposes. The excellent insulation properties of foams arise from the presence of closed cells containing air or a blowing agent. As illustrated in FIG. 1, energy 3 applied on one side of the foam can be transferred to the other side through cell walls 1 in zigzag paths 4 and, somewhat, through the gas in the cells 2. In other words, the two components in polymer foam, polymer and blowing agent, form a parallel model for energy transfer. The greater the number of cells in a given volume, the greater the resistance to energy transfer. Nevertheless, as seen in FIG. 1, the input and output sides of any foam are still interconnected by the cell walls 1, and remain so no matter how low the foam density (or how high the cell density) is. As a result, though the incorporation of cellular morphology is effective in reducing thermal conductivity and dielectric constant, enhanced insulating properties are achieved at very low densities and, thus, at the expense of a loss in materials' strength.

Figure 2:
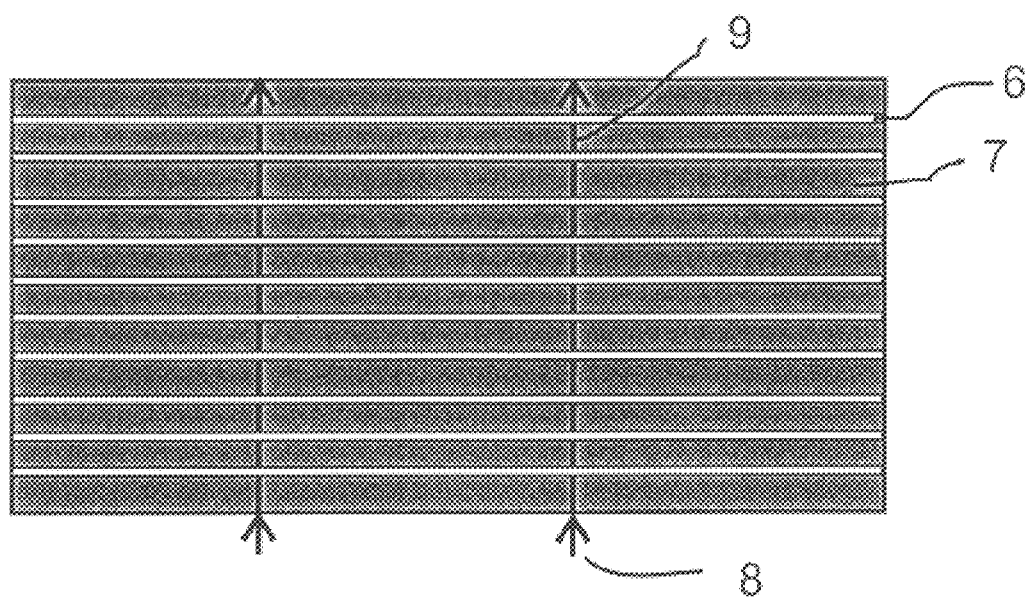
FIG. 2 is a proposed model for materials with improved insulation properties.

In order to improve this, a structure as shown in FIG. 2 was designed. A group of parallel narrow gaps 6 containing air or blowing agent could be incorporated into a polymer, thereby splitting the polymer into many layers 7. Therefore, the energy 8 applied on one side of the material has to pass through all the gaps 6 in order to be transferred to the other side. In other words, energy transfer 9 in such a material follows a series model of polymer and gas, in which the gas-filled gaps make a significant contribution to the insulation properties even when their total volume content is low.

Two new methods were designed to produce polymeric materials based on above model. The first one consists of introducing some periodically distributed weak interchain connections into a polymer, dissolving a selected blowing agent in to the polymer, and then removing the polymer from the blowing agent to an ambient environment to separate the weak connections to create discontinuous gaps, and thus the layered structure.

The second method includes the introduction of a blowing agent into a homogenous polymer, and the use of stress-induced cell nucleation and stress-forced directional cell growth.

Different materials, including those containing nanometer wide gaps ($\leq 100$ nm in width) and those containing micrometer wide gaps ($\geq 1$ μm width), can be produced by the two methods. These materials are named here as nanolayered polymers and microlayered polymers, according to the gap width.

Nanolayered Polymers

Figure 3:
FIG. 3 is the SEM microphotograph of nanolayered polystyrene (PS) shown at two different magnifications.
Figure 4:
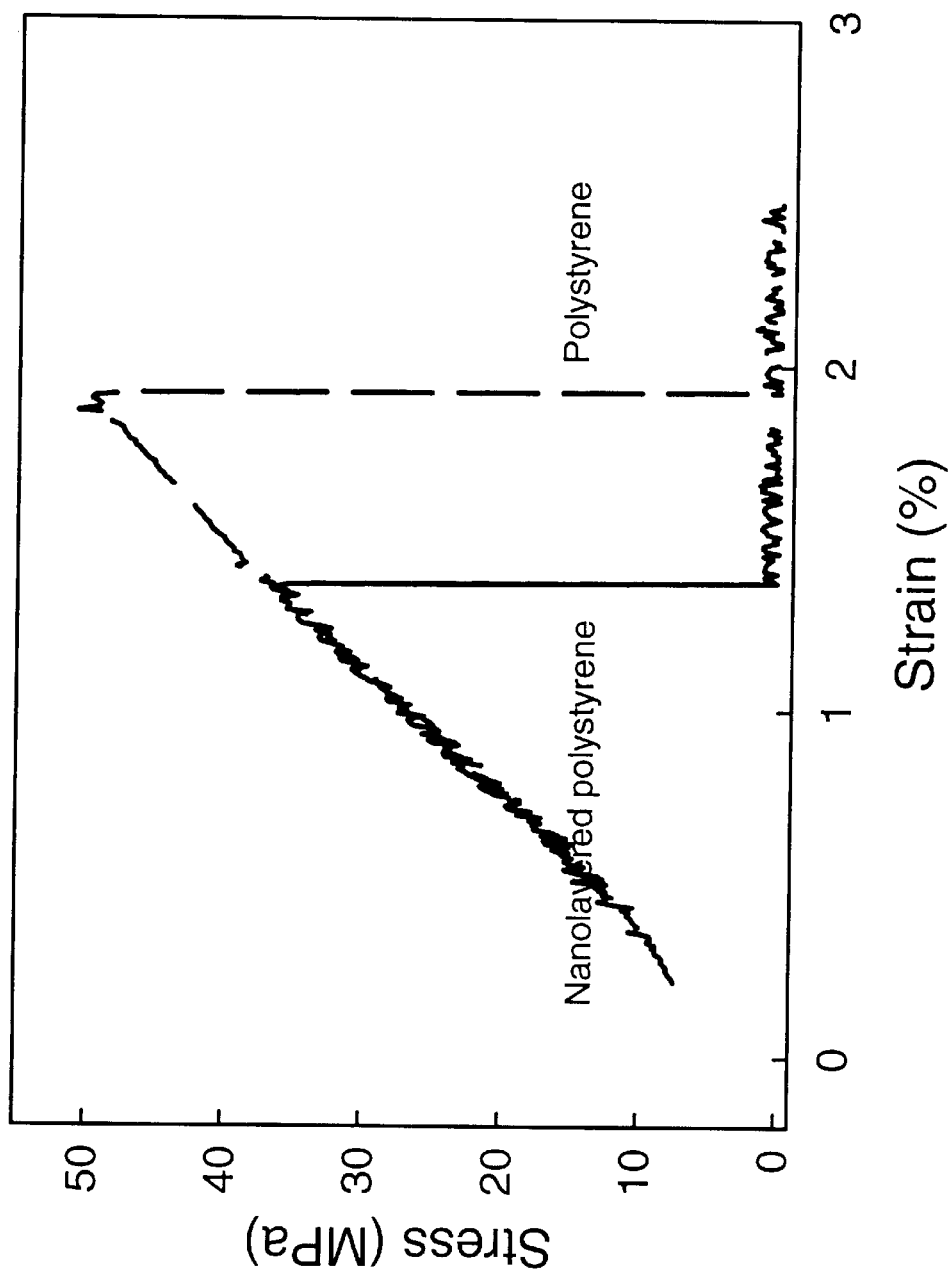
FIG. 4 is the tensile stress-strain curve for nanolayered PS and neat PS at room temperature.

FIG. 3 shows the SEM microphotograph of nanolayered polystyrene (PS) sheet. The material has the designed morphology as illustrated in FIG. 2 and consists of polymer layers, each about 10 μm thick, separated by very narrow discontinuous gaps. The material has an opaque silvery appearance due to the light reflected by the inside layers and the light scattered by the gas-filled gaps. The thickness of the gaps is estimated to be less than about 100 nm. Tables 1 and 2 show the thermal conductivity and dielectric constant, respectively, and FIG. 4 shows the mechanical behaviour of the material.

Table 1 compares the thermal conductivity of nanolayered PS with other solid polymers and polymeric foam materials. Although the layered material has a density about 13% lower than that of the solid PS matrix, its thermal conductivity is about 37% lower than that of PS. The efficiency in thermal conductivity reduction can be expressed by the ratio of thermal conductivity change to density change $\Delta\kappa/\Delta\rho$, which is about 1.4 for nanolayered PS, but only 0.4 for PS polymer foams.

TABLE 1

Thermal Properties of Various Polymeric Materials

| Sample | Density ρ (g/cm³) | Thermal conductivity κ (W/m K) | Δκ/Δρ (10⁻⁶ W m²/g K) |
|---|---|---|---|
| Polystyrene | 1.05 | 0.455 | — |
| Polystyrene conventional foams | 0.027 | 0.078 | 0.367 |
| PMMA | 1.18 | 0.461 | — |
| PMMA microcellular foams | 0.275 | 0.111 | 0.387 |
| Nanolayered Polystyrene | 0.933 | 0.298 | 1.342 |
| Nanolayered Polystyrene | 0.911 | 0.285 | 1.452 |

Table 2 shows the dielectric constant of nanolayered-PS and PS. Nanolayered PS is seen to have a dielectric constant much lower than that of PS. It should be noted that parallel plate technique was used to make dielectric constant measurements, and a stress was applied to the materials to ensure good contact between electrodes and the materials. Such stress might deform the layered materials, resulting in a somewhat increased dielectric constant. Thus, the results in Table 2 can be taken to represent the lower limit to which the dielectric constant is reduced by incorporating a layered morphology. The efficiency of layered structure in reducing dielectric constant ϵ can again be expressed by the ratio of ϵ reduction to the density reduction, $\Delta\epsilon/\Delta\rho$. The value for this ratio is 3.24 for nanolayered PS, as shown in Table 2, but only 1.28 for conventional PS foams as calculated from literature data (see Knott[2]).

TABLE 2

Dielectric constant of polystyrene and nanolayered polystyrene

| Sample | Density ρ (g/cm³) | Dielectric Constant ϵ (10 to 10³ Hz) | Δϵ/Δρ (cm³/g) |
|---|---|---|---|
| Polystyrene | 1.05 | 2.34 | — |
| Polystyrene* Foam | 0.025 | 1.03 | 1.28 |
| Nanolayered Polystyrene | 0.914 | 1.91 | 3.24 |

*See Knott[2]

While keeping a density close to that of neat PS matrix, the new material exhibits quite low thermal conductivity and dielectric constant. Since sound propagation through materials occurs by the same mechanism as the heat transport, it is expected that the layered materials will show superior sound damping characteristics over other types of polymeric foam.

The layered materials are also expected to have a great potential for application in thermal and electrical insulation. Another interesting property exhibited by the layered materials is that they can serve as a temperature sensitive smart fuse or sensor because the layered morphology disappears at a certain temperature above the polymer's $T_g$. For example, nanolayered PS has an opaque silvery appearance, but after maintaining it at 120° C. for half an hour, it becomes transparent, and the layer structure and gaps in the material disappear. That is, the material recovers the transparent appearance, thermal conductivity, dielectric constant, and density of the parent PS. This means that the material will lose its insulation properties when the working temperature reaches a certain preset security temperature.

FIG. 4 compares the tensile behavior of nanolayered PS with that of neat solid PS. The layered material has the same modulus as neat PS, and maintains 80% of the original strength. The high density of the material and the sparse interconnections between the layers are believed to be responsible for the unique properties observed in Tables 1 and 2 and in FIG. 4. This gives the layered materials an advantage over the foams because a much lower density is required for foams to achieve equivalent thermal and electrical insulation properties, but the foams tend to become mechanically weak at such low densities. In addition to the mechanical advantage, the layered materials can be processed to various shapes, which are desirable for diversified applications such as in thermal and electrical insulation.

The layered materials are strong and have very good dimensional stability (due to their high modulus) even under significantly high stress as shown in FIG. 4. In addition, the materials can be processed into various shapes, offering flexibility in their application. Shaping can be done before the materials are layered. Nanolayered PS wave sheets, for example, can be easily made by first producing wave sheets containing special inhomogeneous entanglements as described below, followed by incorporating the layered morphology using the process according to the invention.

The key step in making nanolayered polymers is to introduce regions containing weak interchain-connections. Such weak regions have a lower degree of polymer chain entanglements than those in the rest of the polymer. In other words, a low degree of chain entanglements should be incorporated into an otherwise highly entangled polymer matrix such that the weak regions are distributed in the polymer matrix in the same way as the gaps in FIG. 2. This reasoning is based on the fact that the mechanical strength of a polymer arises from the extensive chain entanglements among its macromolecules. By extension then, if the entanglements among the macromolecules can be controlled to a low level, the polymer will show poor mechanical properties. For example, polymers with low molecular weight have poor mechanical properties and low viscosity due to a much lower degree of entanglements. See, Ferry.[5]

Figure 5:
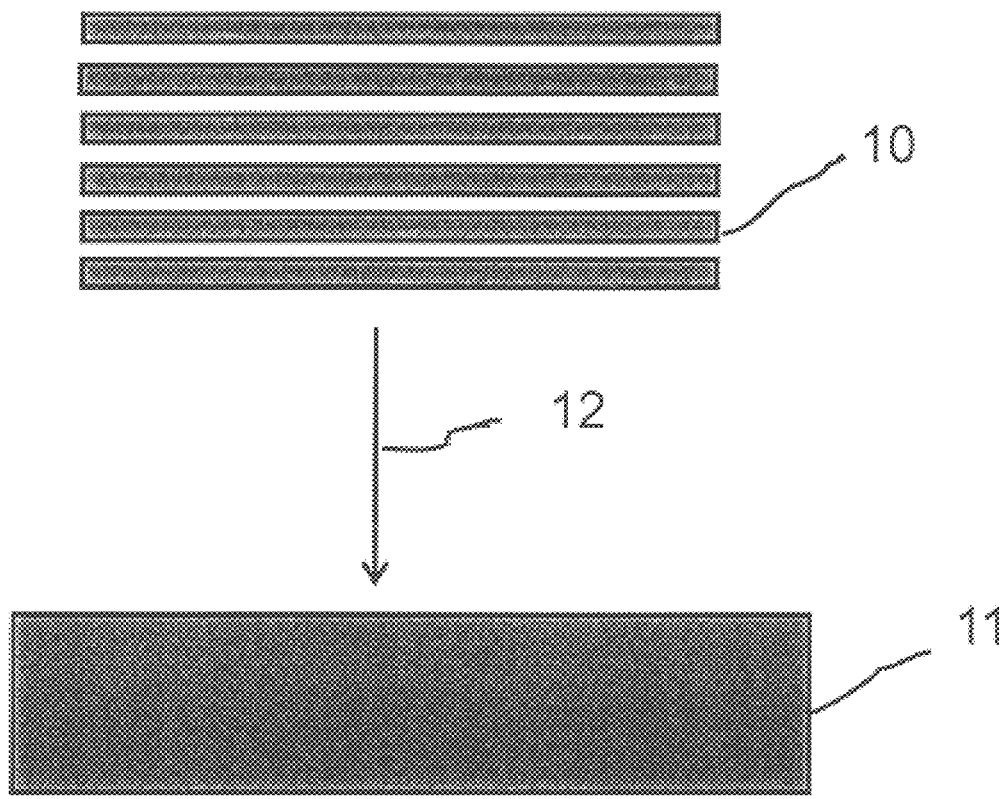
FIG. 5 is a schematic of introducing low entanglements in polymers by compression molding stacked polymer films.
Figure 6:
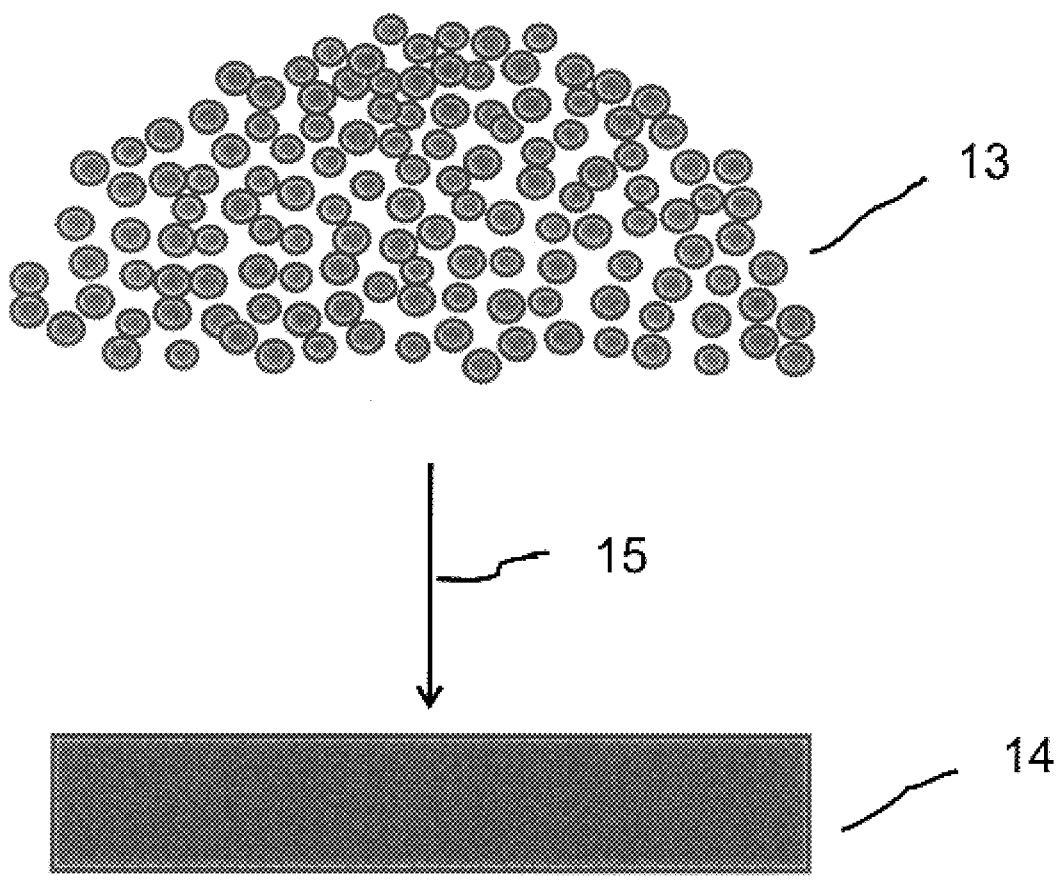
FIG. 6 is a schematic of introducing low entanglements in polymers by compression molding polymer particles.

A special approach based on interfacial polymer chain diffusion was designed to produce such inhomogeneously entangled polymers. As is well known, two pieces of the same polymer or compatible polymers can be welded by heating their contact surfaces using various techniques such as thermal and ultrasonic methods. The mechanism by which welding takes place in our process is that during heating the chain diffusion occurs at the interface between the two pieces e.g. adjacent polymer layers, leading to polymer chain entanglements in the interfacial region. Depending on the processing conditions, such as temperature, pressure, and heating time, the diffusion, and thus the degree of entanglement, is theoretically controllable. In the present invention, we first chose welding polymer films using compression molding, and then extended the concept to welding polymer particles, also using compression molding, to produce materials containing regions of interfacial polymer chain diffusion. FIGS. 5 and 6 illustrate the processes for generating such inhomogeneous chain entanglements. In FIG. 5, a stack of polymer films 10 are processed into a sheet 11 or an article of desired shape by compression molding 12. In FIG. 6, a stack of polymer particles 13 are processed into a sheet 14 or an article with desired shape by compression molding 15.

It should be noted that the macromolecules in the films or particles of any polymer with high enough molecular weight are highly and homogeneously entangled. By controlling the molding temperature, pressure, and time, low chain-entanglement regions can be easily achieved at the interfaces between the films. Obviously, according to the above mechanism, since a film can provide only two interfaces, the materials made from films will have alternate regions of low and high entanglements.

Figure 7:
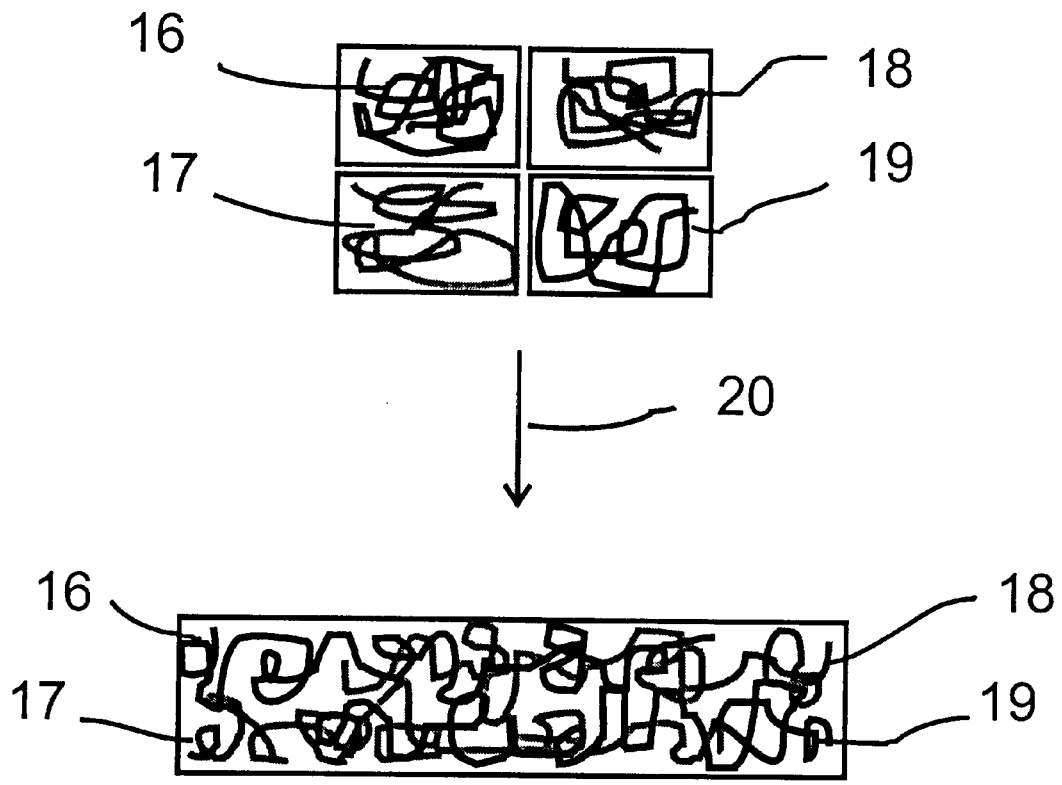
FIG. 7 is a model illustrating the effect of stress on chain diffusion in two directions.

It is interesting to note that similar structure is also generated in the materials made from particles even though a particle can provide several interfaces. In the latter case, the applied stress is believed to play a vital role. It favors the chain diffusion in the direction normal to the stress but not in the stress direction. In FIG. 7, a simple model is illustrated to explain this. Macromolecules 16, 17, 18, and 19 in various particles will easily flow and orient in the direction normal to stress applied during a compression molding process 20, resulting in much more interchain diffusion, and thus much higher chain entanglements, in this direction than those in the stress direction. The entanglement distribution achieved and hence the layer thickness will depend on the film thickness or particle size, and the processing conditions such as temperature, pressure, and stress. Materials with a fine distribution of low entangled parts are obtained from thin films or fine particles molded at high temperature and high stress. Such materials on treatment with an appropriate blowing agent give nanolayered polymers with high layer density and gap density. The effects of film thickness and particle size can be clearly seen in the examples given below.

It is important to establish the temperature, pressure, and time parameters for the molding process. Typically, a temperature around 100° C. above the polymer's $T_g$ and a holding time over 3 minutes are suitable. For example, 190 to 230° C. for 5 to 20 minutes was found to be suitable for processing polystyrene (PS) under a compressive stress of 20 MPa, and 230 to 260° C. for 5 to 10 minutes for polycarbonate (PC) also under a compressive stress of 20 MPa. There does not appear to be anything special about the materials thus processed. They are transparent as regular extruded or cast polymers. The fractured surface of PS, compression molded from ten layers of cast film, shown in FIG. 8, has the typical characteristics of homogeneous PS. However, at the molecular level, these materials contain regions of low entanglement that can be easily disentangled using a blowing agent. Basically, the obtained materials can be exposed to a blowing agent to achieve a desirable solubility, removed from the blowing agent, and then transferred to an ambient-pressure environment at a temperature below the $T_g$ of the polymer-blowing agent system. Discontinuous gaps develop immediately along the low entangled regions, resulting in the layered morphology. For example, the material shown in FIG. 8 exhibited the layered morphology shown in FIG. 9, after it was exposed to 58 atm $CO_2$ at 24° C. and then heated to 50° C. under ambient pressure. The morphology development is considered to be due to the rapid desorption of the blowing agent caused by the sudden thermodynamic instability imposed on the system as it is removed from the blowing agent environment. In the glassy state, the high entangled parts have regular modulus and strength, and will not deform during the gas desorption. On the other hand, the interfacial regions with low entanglements are mechanically weak and allow gas nucleation and expansion.

The above layered morphology development process in a polymer containing dissolved blowing agent is similar to the microcellular foaming process. See, for example, U.S. Pat. No. 4,473,665 issued on Sep. 25, 1984, assigned to J. E. Martini-Vvedensky et al.; U.S. Pat. No. 5,223,545, issued on Jun. 29, 1993, assigned to V. Kumar; U.S. Pat. No. 5,670, 102 issued on Sep. 23, 1997, assigned to C. A. Perman et al. However, as mentioned earlier, the layered structure is produced when the temperature of the polymer-blowing agent system is below its $T_g$ whereas in microcellular or conventional foaming, the processing temperature is above the system's $T_g$. If the process described here is carried out at a temperature above the system's $T_g$, a cellular structure develops in the material and the desired layered morphology can not be achieved.

Figure 9:
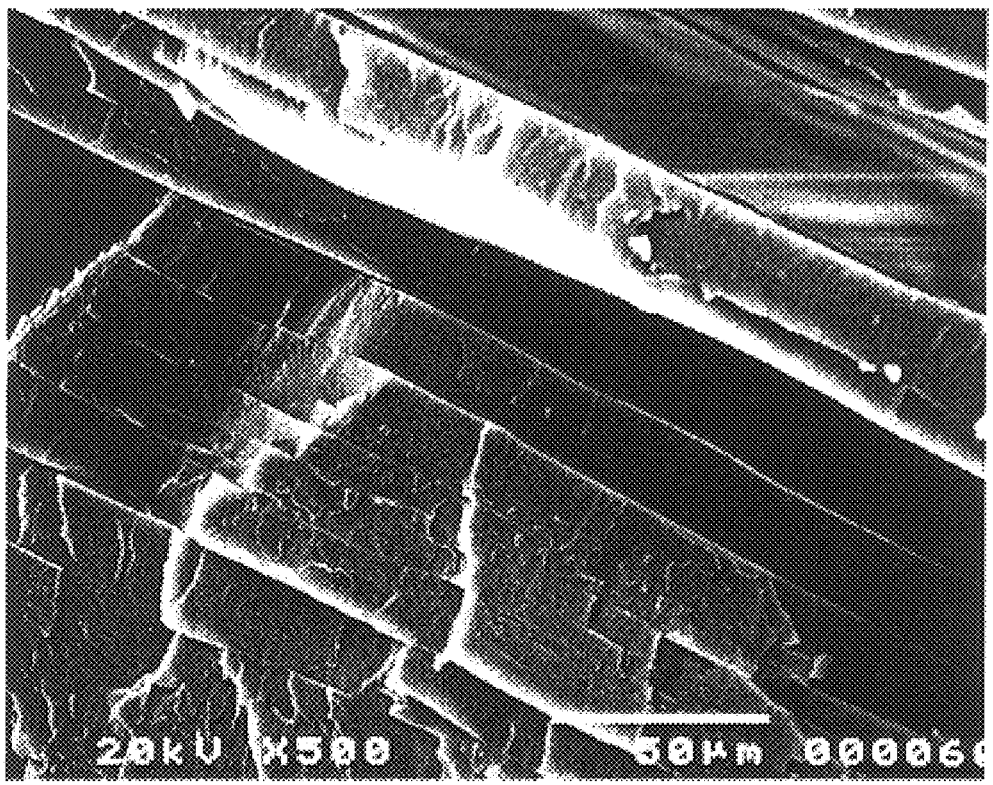
FIG. 9 is the SEM microphotograph of nanolayered PS produced from the material in FIG. 8 after dissolving 10 wt % $CO_2$ in it and then exposing to ambient pressure at 50° C.
Figure 10:
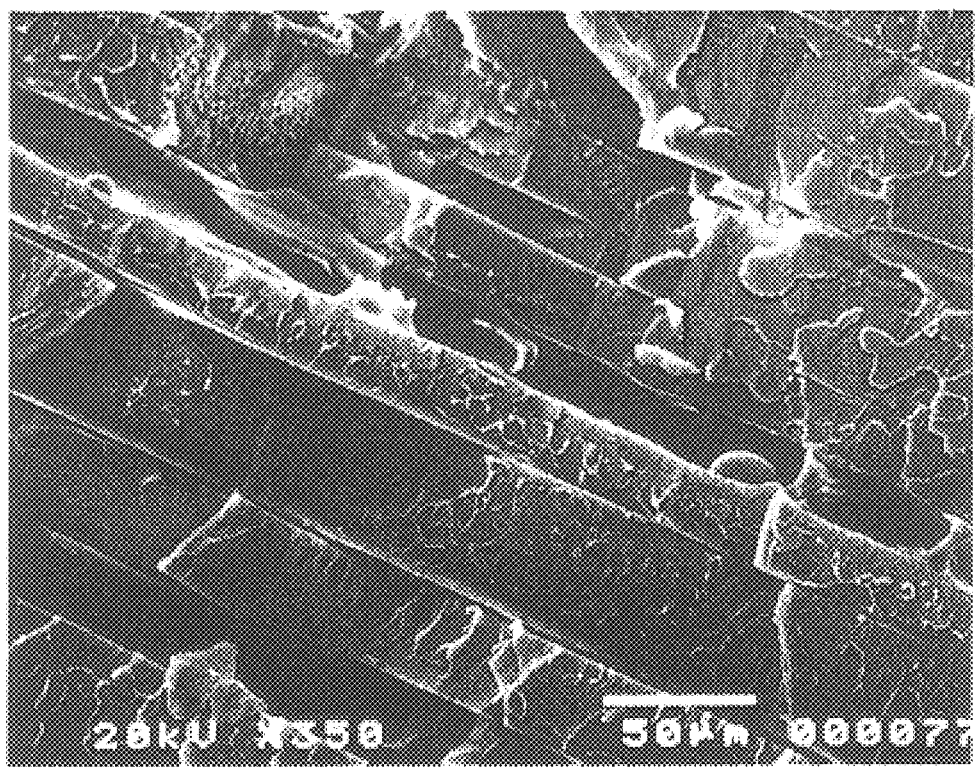
FIG. 10 is the SEM microphotograph of PS nanolayered at 24° C. when it contained 13 wt % $CO_2$, original material was the same as in FIG. 8.

As is required in the foaming process, a certain solubility of the blowing agent in the polymer is necessary for developing the desired layered morphology. The reason being that a sufficient force generated by gas desorption is needed to break the low entangled parts. The minimum solubility required depends on the processing temperature. A lower solubility is required for processing at higher temperatures because gas activity increases with temperature and the material strength decreases with increasing temperature. For example, when the $CO_2$ solubility in PS is below 8 wt %, layered morphology does not develop at 24° C. but does so easily at a temperature above 40° C. However, when the solubility is increased to 13 wt %, nanolayered morphology can be developed at 24° C. FIGS. 9 and 10 show the nanolayered PS morphologies obtained from the samples containing 10 wt % $CO_2$ and layered at 50° C. and 13 wt % $CO_2$ and layered at 24° C., respectively.

In some circumstances, especially when the solubility of the blowing agent in the polymer is quite high, a small external stress is helpful in ensuring the layered materials' quality. It was noted that the desorbed gas tends to accumulate in the generated gaps and then undergoes expansion. When the expansion force is too high, the gaps might be widened to over 100 nanometers. In step (c), the application of a small stress, as small as 2 atm, can prevent the gaps from growing too wide and to ensure a uniform, nanolayered morphology.

Nanolayered polystyrene (PS), polycarbonate (PC) and polyethersulfone (PES) are reported here as examples of application of the process. In fact, all thermoplastics can be processed into nanolayered polymers. This offers a great application potential for nanolayered polymers because several thermoplastics are available for meeting various requirements. For instance, nanolayered PS ($T_g$=105° C.) and PC ($T_g$=149° C.) can be used in the regular-temperature environment, while nanolayered PES ($T_g$=220 C.) could be used as a high-temperature material.

It should be noted that the multi-polymer materials ie. blends of compatible polymers, or polymer blends, are especially suited for producing nanolayered materials because the interchain diffusion between layers of two different polymers is usually not as strong as that between two layers of a single polymer and, thus, weak chain entanglement in between adjacent layers is easily obtained in such materials. Depending upon the compatibility of the different polymers, an appropriate process can be easily developed to produce first the multi-polymeric material with the desired weak chain entanglement, and then the multilayered polymeric material. Nanolayered polystyrene-syndiotactic polystyrene is reported here as an example of application of the process to a multi-polymeric material.

Microlayered Polymers

Figure 11:
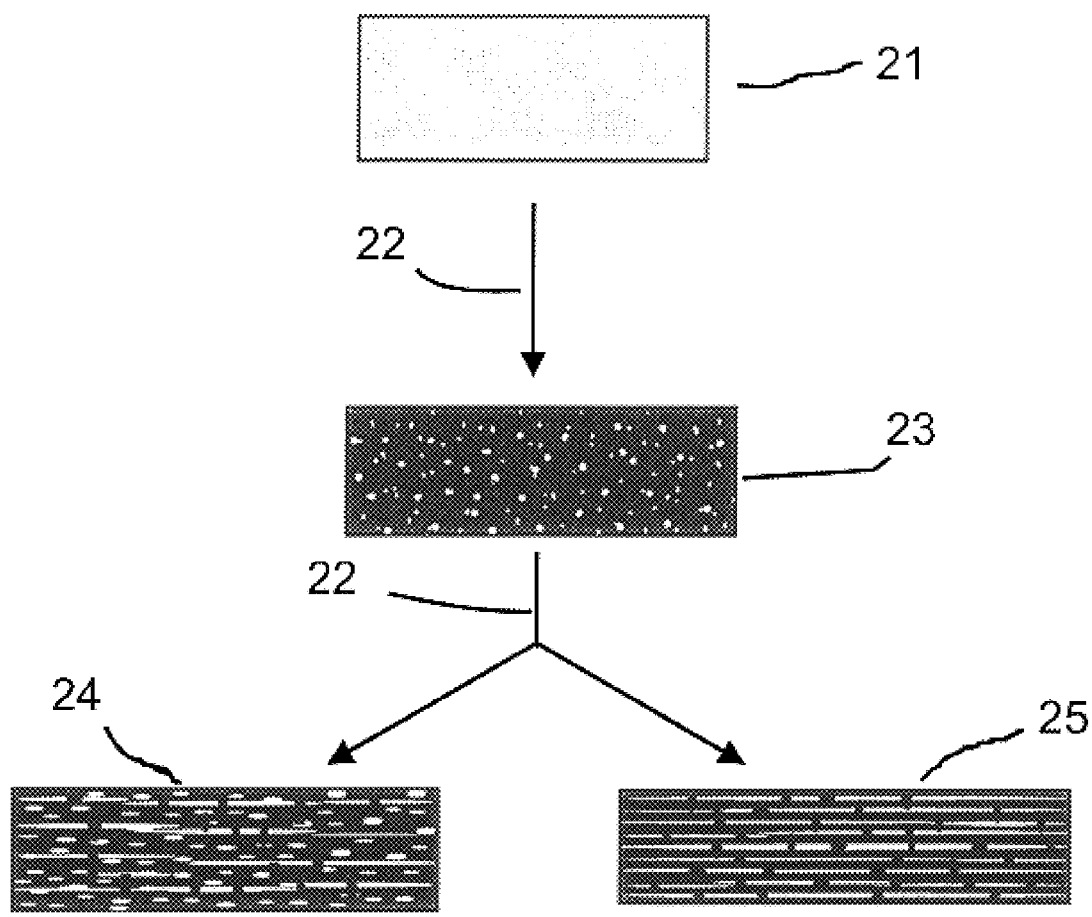
FIG. 11 is a model illustrating the microlayered morphology development under stress.

The process and the mechanism for making microlayered polymers are quite different from those for the nanolayered polymers. The inhomogeneous entanglement required to produce nanolayered polymers is no longer necessary. Instead, a high external stress is required to produce microlayered morphology from polymers containing dissolved blowing agent. FIG. 11 illustrates the process and the mechanism. When a homogeneous polymer-blowing agent solution 21 is subjected to compression stress 22, cells filled with the blowing agent 23 nucleate instantly in the system. The growth of the cells is governed by the stress 22, which is kept constant during the whole process, and occurs in a direction normal to the direction of the applied stress. On releasing the stress, a microlayered morphology with the polymer layers containing small cells 24 is obtained. However, when the applied stress is quite high, the microlayered morphology obtained contains polymer layers without any cells 25. It appears that under high stress, the cells which initially formed in the polymers layers coalesce to form discontinuous gaps.

Briefly, a polymer can be exposed to a selected blowing agent under certain pressure and temperature conditions until equilibrium, and then removed to an ambient-pressure environment for compression stressing. When the saturated polymer is stressed at a temperature higher than the $T_g$ of the polymer-blowing agent system and the applied stress is high enough, cell nucleation occurs in the polymer instantly, followed by the development of layered morphology. A minimum solubility of blowing agent in the polymer is required for the stress-induced cell nucleation to occur and the layered morphology to form. It depends mainly on the polymer-blowing agent system under consideration, and is typically above 5 wt %. Nevertheless, a high solubility is always desirable to achieve high layer density and high gap density. For example, when the $CO_2$ solubility in poly (methyl methacrylate) (PMMA) is above 20 wt %, a layer density of over 600 layers/mm can be achieved.

In addition to the blowing agent solubility, processing temperature and the stress applied on the system also play important roles in defining the microlayered morphology. Layered morphology, in fact, will form only when the compressive stress is sufficiently high. If the stress is relatively low, the morphology obtained is that of microcellular foam. For instance, a stress of 370 atm is required for producing microlayered PMMA, but a stress between 130 to 270 atm is suitable for making microcellular PMMA foam. High stress forces the cell growth along the direction normal to the direction of the applied stress and the cells along the growth direction tend to fuse or interconnect. Processing temperature also directly affects the layered morphology because polymer viscosity decreases with increasing temperature. When the processing temperature is far above the $T_g$ of the polymer-blowing agent system and the stress is very high, cells are unlikely to get trapped within the layers, and the layers are separated by discontinuous gaps. On the other hand, when the temperature is only slightly higher than the $T_g$ and the stress is not very high, the microlayered polymers produced contain elliptical cells within the layers in addition to the discontinuous gaps in-between the layers.

EXAMPLE 1

Figure 8:
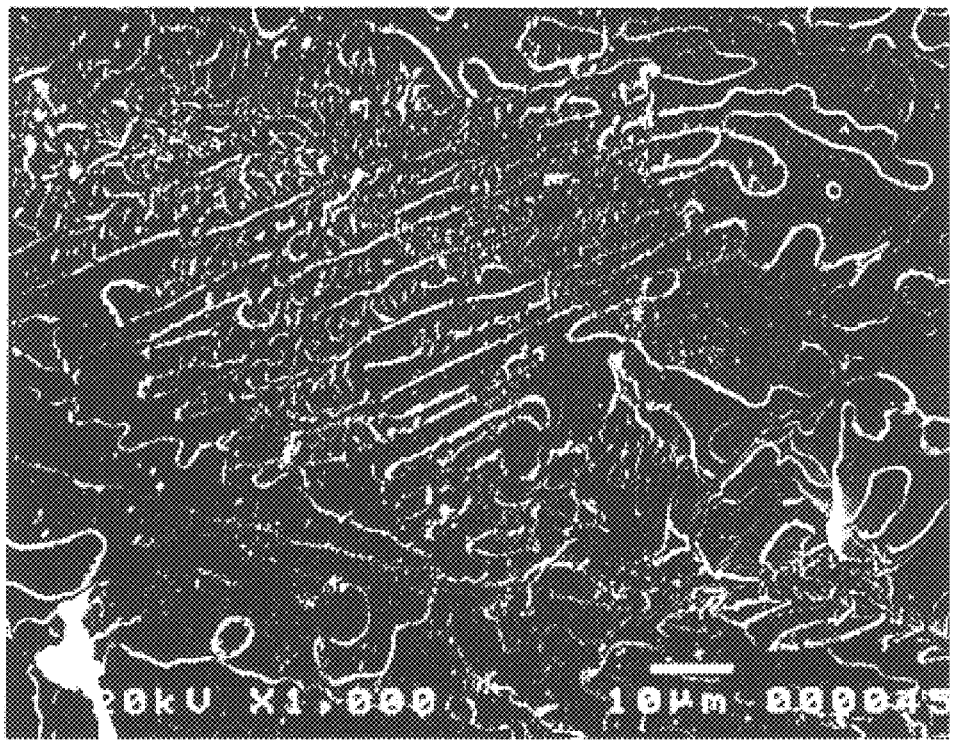
FIG. 8 is the SEM microphotograph of PS sheet compression molded from stacked films.

Polystyrene (PS) particles around 40 μm in diameter, obtained from Scott (C-35), were solution cast into dense, homogeneous films around 80 μm thick. Eighty layers of this film were then stacked together and compression molded under 20 MPa at 200° C. for 5 minutes into 0.5 mm thick sheet. The fractured surface along the thickness direction is shown in FIG. 8. The sheet was exposed to 58 atm $CO_2$ at 24° C. for 24 hr to achieve a $CO_2$ solubility of 10 wt %. After the pressure was released slowly, the sheet was taken out of the pressure vessel and dropped into 50° C. water for 1 minute. The polymer became layered instantly and its appearance changed from transparent to silvery. FIG. 9 shows the fractured surface of the nanolayered polymer.

EXAMPLE 2

Polystyrene (PS) sheet, as prepared in EXAMPLE 1, was exposed to 34 atm $CO_2$ at −0.2° C. for 48 hr to achieve a $CO_2$ solubility of 13 wt %. After releasing the pressure slowly, the sheet was taken out of the pressure vessel and transferred to a 24° C. ambient pressure environment. Layered morphology developed gradually and the polymer's appearance changed from transparent to silvery over a period of about 3 minutes. FIG. 10 shows the fractured surface of the nanolayered polymer.

EXAMPLE 3

Figure 12:
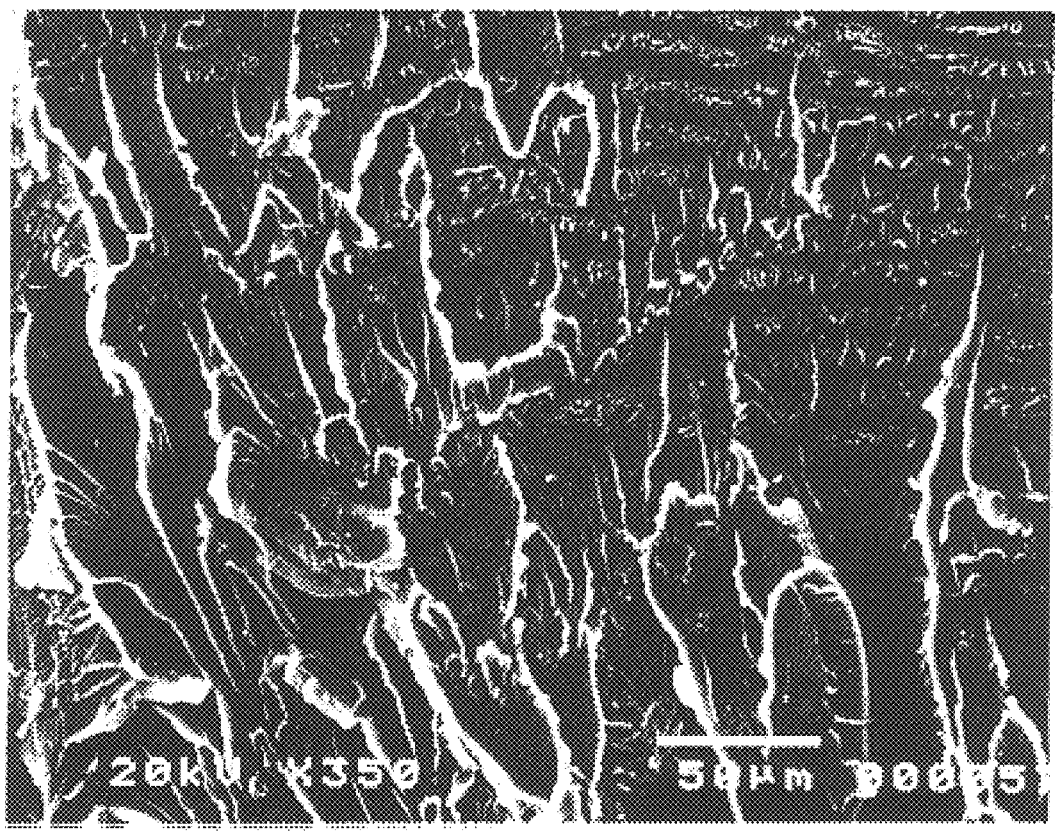
FIG. 12 is the SEM microphotograph of polycarbonate (PC) sheet compression molded from stacked films.
Figure 13:
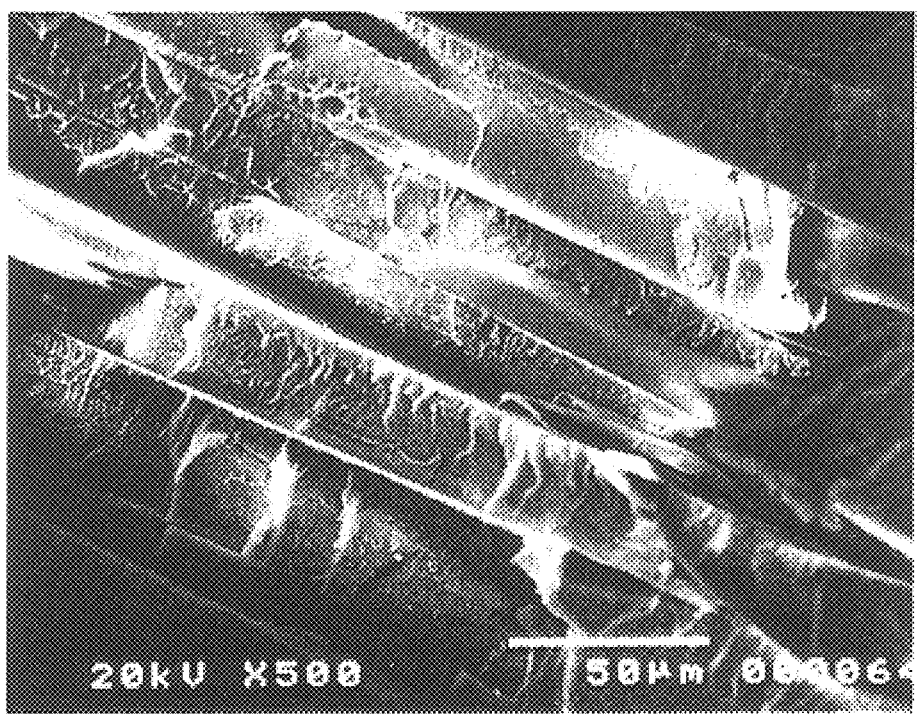
FIG. 13 is the SEM microphotograph of PC nanolayered at 40° C. when it contained 6 wt % $CO_2$, original sample was the same as in FIG. 12.

Polycarbonate (PC) cylindrical pellets about 3 mm×3 mm, obtained from GE (Lexan 141K-111), were compression molded under 20 MPa at 240° C. into films around 100 μm thick. Twenty layers of this film were then stacked together and compression molded under 20 MPa at 240° C. for 5 minutes into 1.2 mm thick sheet. The fractured surface of the PC sheet is shown in FIG. 12. The sheet was exposed to 58 atm $CO_2$ at 24° C. for 48 hr to achieve a $CO_2$ solubility of 6 wt %. After releasing the pressure slowly, the sheet was taken out of the pressure vessel and transferred to 40° C. water at ambient pressure for 1 minute. The polymer became layered and its appearance changed from transparent to silvery. FIG. 13 shows the fractured surface of the nanolayered polymer.

EXAMPLE 4

Figure 14:
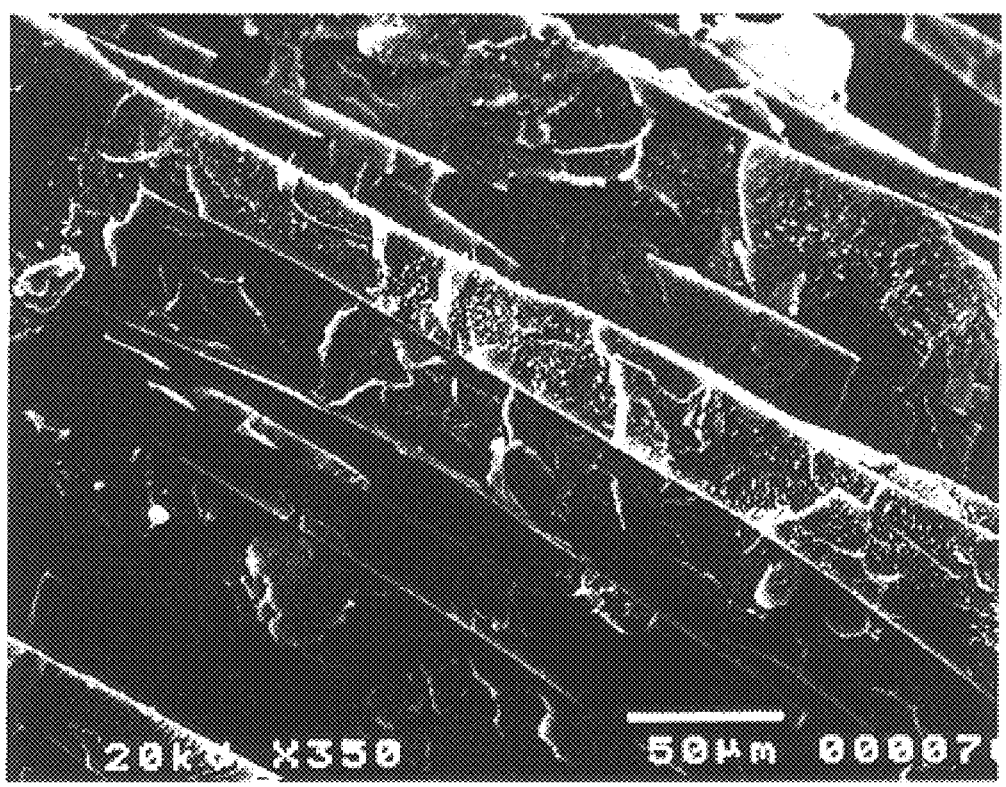
FIG. 14 is the SEM microphotograph of PC nanolayered at 24° C. when it contained 12 wt % $CO_2$, original sample was the same as in FIG. 12.

PC sheet, as prepared in EXAMPLE 3, was exposed to 34 atm $CO_2$ at −0.2° C. for 48 hr to achieve a $CO_2$ solubility of 12 wt %. After the process as in EXAMPLE 2, layered morphology developed in the polymer. FIG. 14 shows the fractured surface of the nanolayered polymer.

EXAMPLE 5

Figure 15:
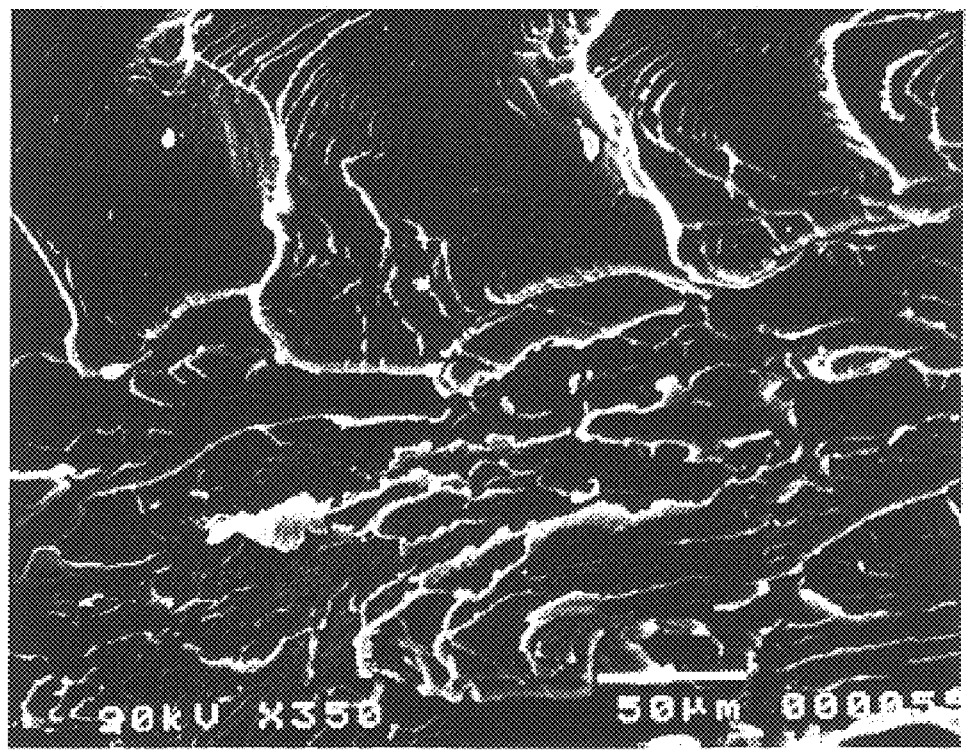
FIG. 15 is the SEM microphotograph of poly(ether sulfone) (PES) compression molded from stacked films.
Figure 16:
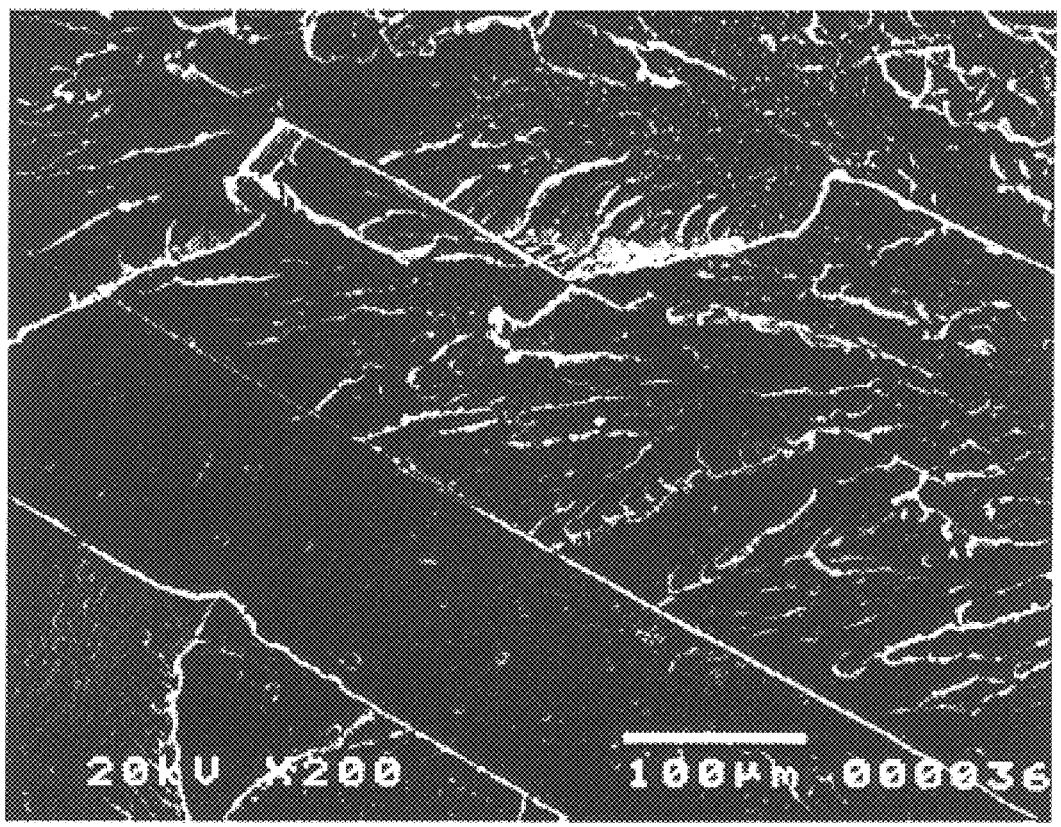
FIG. 16 is the SEM microphotograph of PES nanolayered at 100° C. when it contained 9 wt % $CO_2$, original sample was the same as in FIG. 15.

Polyethersulfone (PES) cylindrical pellets around 3.4 mm×2.8 mm, obtained from Aldrich (19,108-6), were compression molded under 20 MPa at 280° C. into films around 200 μm thick. Ten layers of this film were then stacked together and compression molded under 20 MPa at 280° C. for 5 minutes into 1.2 mm thick sheet. The fractured surface of the PES sheet is shown in FIG. 15. The PES sheet was exposed to 58 atm $CO_2$ at 24° C. for 48 hr to achieve a $CO_2$ solubility of 9 wt %. After releasing the pressure slowly, the sheet was taken out of the pressure vessel and dropped into 100° C. water for 1 minute. The polymer became layered and its appearance changed from transparent to silvery. FIG. 16 shows the fractured surface of the nanolayered polymer.

EXAMPLE 6

Figure 17:
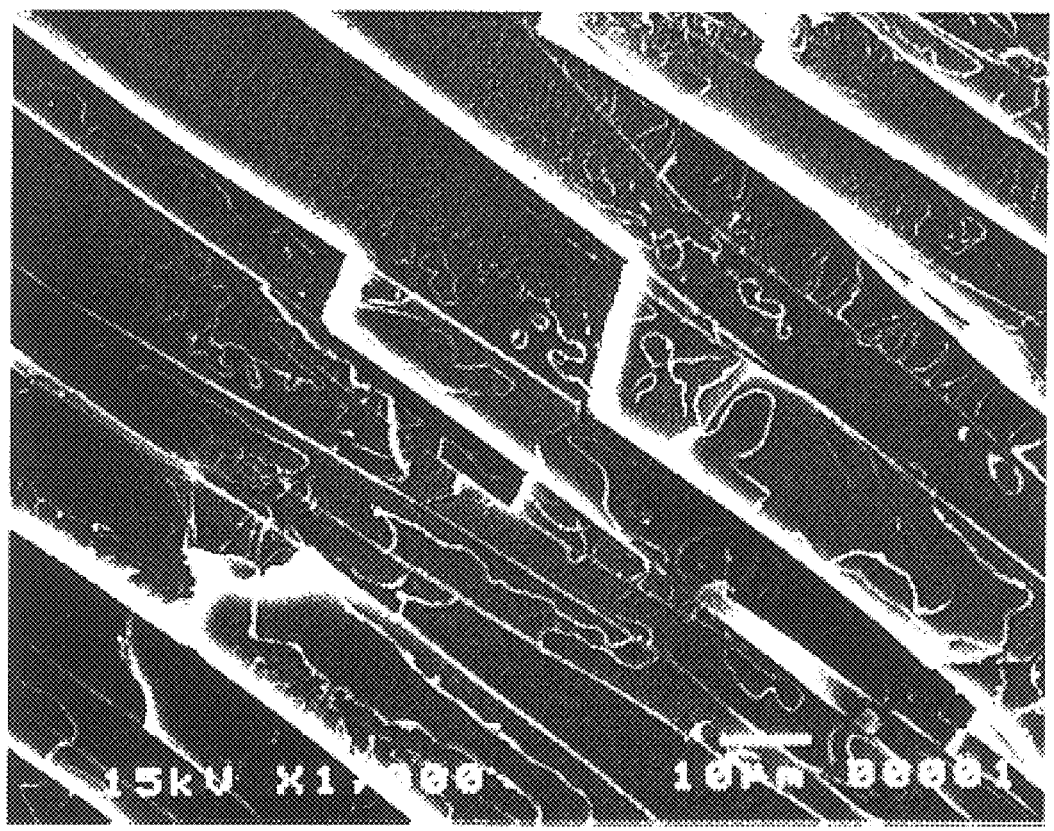
FIG. 17 is the SEM microphotograph of nanolayered PS made from compression molded powder.

Polystyrene (PS) particles around 40 pm in diameter, obtained from Scott (C-35), were compression molded under 20 MPa at 230° C. for 5 minutes into 1.2 mm thick sheet. The fractured surface of the PS sheet was the same as that shown in FIG. 8. The sheet was exposed to 58 atm $CO_2$ at 24° C. for 48 hr to achieve a $CO_2$ solubility of 10 wt %. After releasing the pressure slowly, the sheet was taken out of the pressure vessel and dropped into 40° C. water for 1 minute. The polymer became layered and its appearance changed from transparent to silvery. FIG. 17 shows the fractured surface of the nanolayered polymer.

EXAMPLE 7

PS sheet, as prepared in EXAMPLE 6, was exposed to 34 atm $CO_2$ at −0.2° C. for 48 hr to achieve a $CO_2$ solubility of 13 wt %. After releasing the pressure slowly, the sheet was taken out of the pressure vessel and kept in the ambient environment at 24° C. under a mechanical stress of 2 atm for 1 minute. The polymer became layered and its appearance changed from transparent to silvery. FIG. 3 shows the fractured surface of the nanolayered polymer.

EXAMPLE 8

Figure 18:
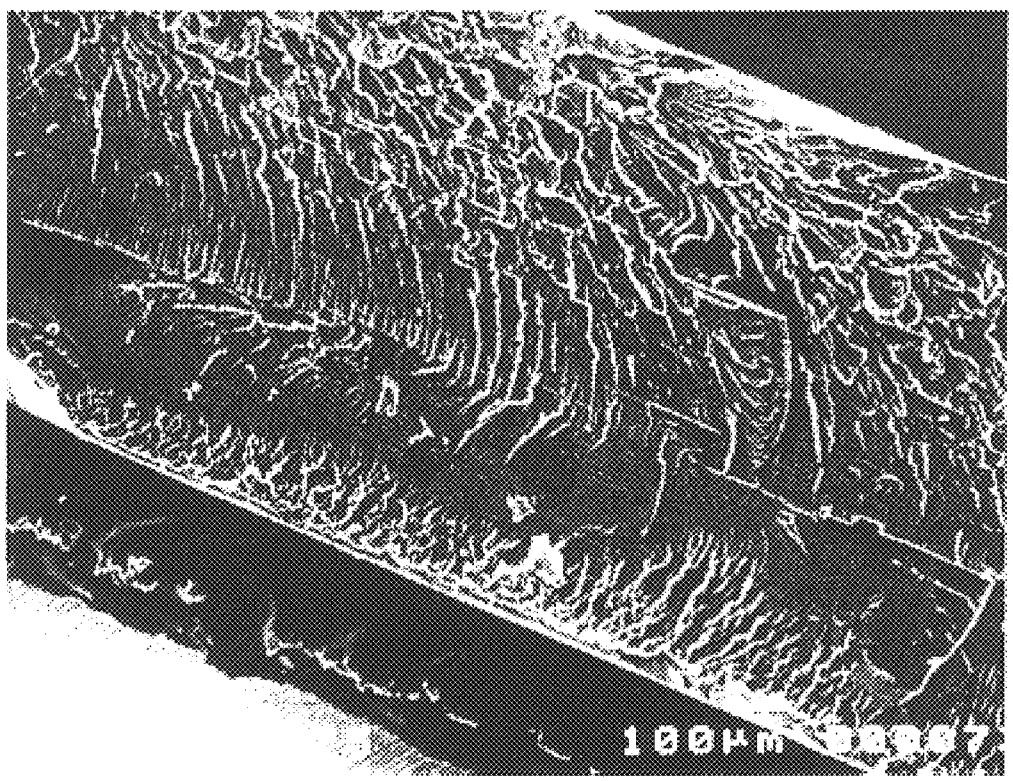
FIG. 18 is the SEM microphotograph of nanolayered PC made from compression molded pellets.

Polycarbonate (PC) pellets with size about 3 mm×3 mm, obtained from GE (Lexan 141K-111), were compression molded under 20 MPa at 240° C. for 5 min into 1.2 mm thick sheet. The sheet was then exposed to 34 atm $CO_2$ at −0.2° C. for 48 hr to achieve a $CO_2$ solubility of 12 wt %. After releasing the pressure slowly, the sheet was taken out of the pressure vessel and transferred to a 24° C. ambient pressure environment. The polymer's appearance changed from transparent to silvery in about 3 minutes. FIG. 18 shows the fractured surface of the nanolayered polymer. As seen in FIG. 18, the sample had only two layers because of the rather large sized pellets used to make the PC sheet.

EXAMPLE 9

Figure 19:
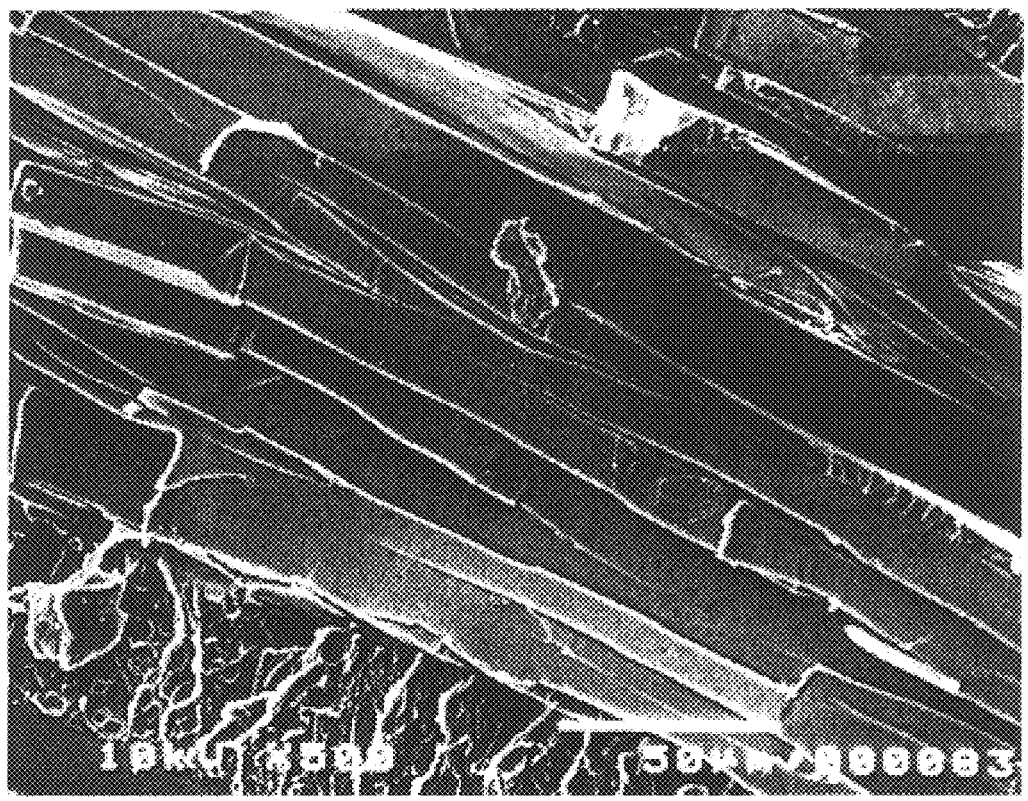
FIG. 19 is the SEM microphotograph of nanolayered PS,syndiotactic(sPS)/PS blend made by compression molding alternately stacked films of PS and sPS.

Polystyrene (PS) particles around 40 μm in diameter, obtained from Scott (C-35), were compression molded at 210° C. into films around 50 μm thick. Semicrystalline syndiotatic polystyrene (sPS), obtained from Dow Chemicals (LA300), were compression molded at 300° C. into films around 50 μm thick. Then nine PS films (A) and eight sPS films (B) were alternately stacked together in the configuration ABABA . . . and compression molded under 20 MPa at 300° C. for 5 minutes into a 0.6 mm thick transparent sheet. The sheet was exposed to 58 atm $CO_2$ at 24° C. for 48 hr. After releasing the pressure slowly, the sheet was taken out of the pressure vessel and dropped into 40° C. water for 0.5 minute. The polymer became layered instantly and its appearance changed from transparent to silvery. FIG. 19 shows the fractured surface of the nanolayered polymer.

EXAMPLE 10

Figure 20:
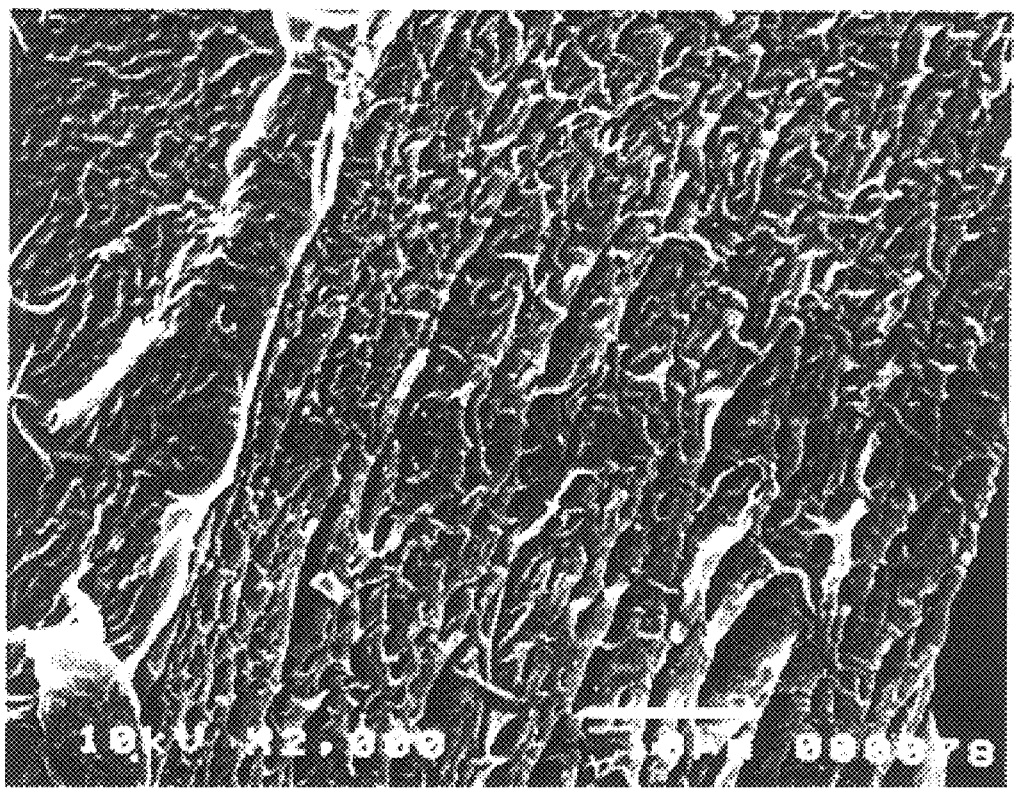
FIG. 20 is the SEM microphotograph of microlayered poly(methyl methacrylate) (PMMA)

Poly(methyl methacrylate) (PMMA) sheet, 2.72 mm thick, obtained from Canus Plastics, was exposed to 34 atm $CO_2$ at −0.2° C. for 24 hr to achieve a $CO_2$ solubility of 22 wt %. After depressurizing slowly, the polymer sheet was taken out of the pressure vessel, compressed in a press at 24° C. under a pressure of 370 atm, and then quenched in ice water. Layered structure developed in the polymer and its appearance changed from transparent to white. FIG. 20 shows the microlayered morphology with the polymer layers containing elongated cells.

EXAMPLE 11

Figure 21:
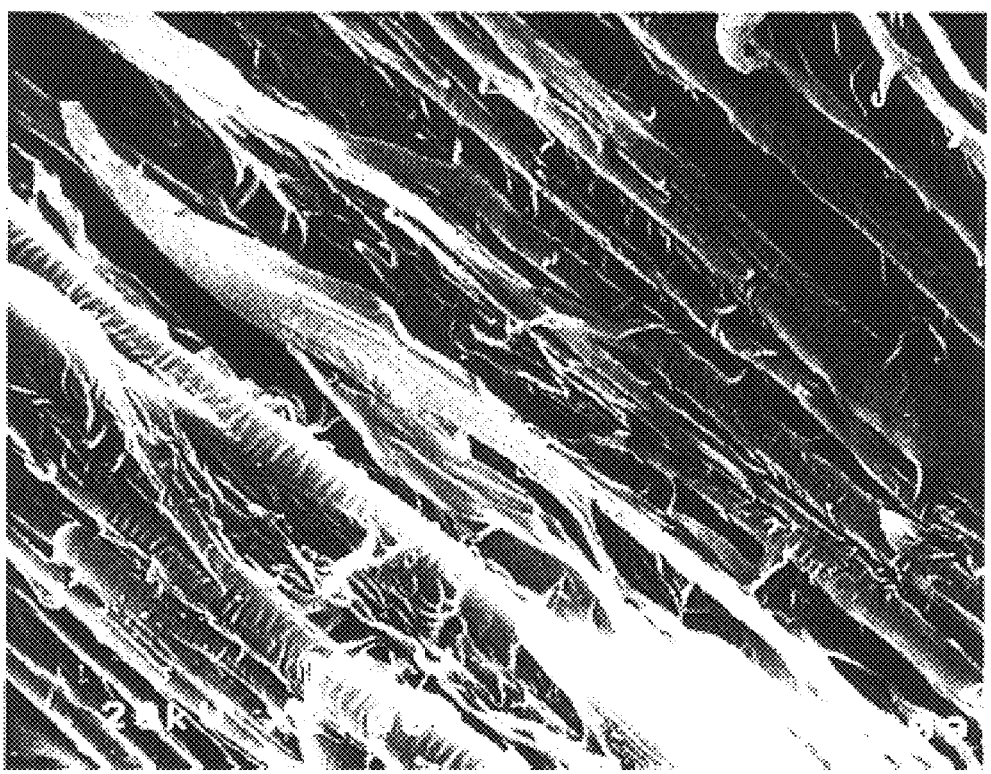
FIG. 21 is the SEM microphotograph of microlayered poly(ethyl methacrylate) (PEMA).

Poly(ethyl methacrylate) (PEMA) particles about 10 μm in diameter, obtained from Aldrich (44,578-9) were compression molded into 1.2 mm thick sheet. The sheet was exposed to 24 atm $CO_2$ at −7° C. for 24 hr to achieve a $CO_2$ solubility of 25 wt %. After depressurizing slowly, the polymer sheet was taken out of the pressure vessel, compressed in a press at 24° C. under a pressure of 500 atm, and then quenched in ice water. Layered structure developed in the polymer and its appearance changed from transparent to white. FIG. 21 shows the microlayered morphology with the polymer layers containing no cells.

Although the invention has been described in terms of specific polymer/blowing agent combinations, it will be appreciated by those skilled in the art that it is applicable to any such combination in which nucleation is induced in the polymer when a polymer/blowing agent solution is exposed to the process conditions described above. In the case of polymer blends, it is also applicable to configurations such as AABAAB . . . and others, in addition to the ABABA . . . configuration reported above in

EXAMPLE 9

Moreover, any amorphous or semi-crystalline thermoplastic polymer can be used. Examples include PMMA, PEMA, polystyrene(PS), polyvinylchloride(PVC), polycarbonate, ABS copolymers, and polyethyleneterephthalate(PET).

For the blowing agent, any inert compound which does not react with the polymer and which is reasonably soluble in the polymer such that it induces nucleation in the polymer under the process conditions described above, may be used e.g. Ar, $N_2$, $SF_6$, $CO_2$, ethylene, and ethane. $CO_2$ is preferred, since it is non-toxic, non-flammable, environmentally acceptable, and inexpensive. It is also advantageous that $CO_2$ is relatively highly soluble in many thermoplastic polymers such as PMMA and PEMA.

It will also be appreciated that other changes and modifications can be carried out without departing from the scope of the invention which is intended to be limited only by the scope of the appended claims.

References Cited

1. Rodriguez-Perez et al., Polymer Testing, 16 (1977) 287–298.

2. Knott, IEEE Transactions on Antennas and Propagation, 41 (1993) 1167–1171.

3. Harding, "Effects of cell geometry on foam performance" in Plastic Foams, Part II, Marcel Dekker Inc., New York, 1973, p. 855–878.

4. Hedrick et al., Advances in Polymer Science, 141 (1999) 1–43.

5. Ferry, "Viscoelastic Properties of Polymers", John Wiley & Sons, Inc., New York, 1980.

We claim:

1. A method for producing an integral multi-layered polymer of nano-layered morphology comprising multiple layers of polymer material and discontinuous gas-containing gaps between adjacent polymer layers, the method, comprising (a) welding together a plurality of pieces of a parent polymeric material at a selected pressure and temperature, for a time sufficient to introduce interfacial entanglements between polymer chains in adjacent pieces such that the degree of interfacial chain entanglement is lower than within the parent polymer, (b) exposing the polymer material thus processed to an inert gas blowing agent to achieve a certain level of solubility of the blowing agent in the polymer, and (c) removing the polymer from the blowing agent to an environment at a pressure of 0 to 2 atm and processing the polymer at a selected temperature below the $T_g$ of the polymer/blowing agent combination for a time sufficient to break the interfacial entanglements, to produce a multi-layered polymer of nano-layered morphology.

2. A method according to claim 1, wherein in step (a) the polymer pieces are in a form selected from the group consisting of films, pellets and particles.

3. A method according to claim 2, wherein the polymer is selected from the group consisting of thermoplastic amorphous polymers and thermoplastic semi-crystalline polymers.

4. A method according to claim 3, wherein step (a) the welding is performed by compression molding.

5. A method according to claim 4, wherein step (c) is effected under a pressure of about 2 atm.

6. A method according to claim 4, wherein the blowing agent is $CO_2$.

7. A method according to claim 6, wherein the polymer is selected from the group consisting of polystyrene, polycarbonate and polyethersulfone.

8. A method according to claim 7, wherein step (a) is effected at a temperature of 200 to 280° C. for about 5 minutes, and wherein step (b) is effected at a pressure of 34 to 58 atm, a temperature of 0 to 24° C. for 24 to 48 h to provide a solubility of the blowing agent in the polymer of 6 to 13 wt %, and wherein step (c) is effected at a pressure of 0 to 2 atm at a temperature of 24 to 100° C. for about 1 minute.

\* \* \* \* \*